United States Patent
Laas et al.

(10) Patent No.: US 6,797,800 B2
(45) Date of Patent: Sep. 28, 2004

(54) METHOD OF DIMERIZING ISOPHORONE DIISOCYANATE

(75) Inventors: Hans-Josef Laas, Bergisch Gladbach (DE); Reinhard Halpaap, Odenthal (DE); Frank Richter, Leverkusen (DE); Jürgen Köcher, Langenfeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 50 days.

(21) Appl. No.: 10/144,608

(22) Filed: May 13, 2002

(65) Prior Publication Data

US 2003/0013872 A1 Jan. 16, 2003

(30) Foreign Application Priority Data

May 14, 2001 (DE) .......................... 101 23 417

(51) Int. Cl.$^7$ .............................................. C08G 18/74
(52) U.S. Cl. .......................... 528/73; 525/440; 540/202
(58) Field of Search .................. 528/73; 525/440; 540/202

(56) References Cited

U.S. PATENT DOCUMENTS

| | | | | |
|---|---|---|---|---|
| 4,476,054 A | | 10/1984 | Disteldorf et al. | 260/239 |
| 4,483,798 A | | 11/1984 | Disteldorf et al. | 260/239 A |
| 4,912,210 A | | 3/1990 | Disteldorf et al. | 540/202 |
| 4,929,724 A | * | 5/1990 | Engbert et al. | |
| 5,621,064 A | | 4/1997 | Laas et al. | 528/60 |
| 6,043,332 A | | 3/2000 | Laas et al. | 528/51 |
| 6,590,098 B2 | * | 7/2003 | Richter et al. | |
| 2002/0095019 A1 | | 7/2002 | Gras | 528/73 |
| 2003/0078450 A1 | * | 4/2003 | Kocher et al. | |

FOREIGN PATENT DOCUMENTS

EP  0 735 027  9/1997

* cited by examiner

*Primary Examiner*—Rachel Gorr
(74) *Attorney, Agent, or Firm*—Joseph C. Gil; Gary F. Matz; Thomas W. Roy

(57) ABSTRACT

The invention relates to a method of preparing a polyisocyanate with at least one uretdione group by oligomerizing part of the isocyanate groups of isophorone diisocyanate in the presence of a catalyst which accelerates the dimerization of isocyanate groups, wherein the oligomerization catalyst comprises a saline compound comprising from 10 to 100 wt. % of 1,2,3- and/or 1,2,4-triazolate structures (calculated as $C_2N_3$; molecular weight=66) in the anion, and the products prepared by this method.

8 Claims, No Drawings

METHOD OF DIMERIZING ISOPHORONE DIISOCYANATE

FIELD OF THE INVENTION

The invention relates to a new method of dimerizing isophoronediisocyanate with triazolate catalysts, the resulting products and starting components for polyurethane plastics and coating powders containing these products.

BACKGROUND OF THE INVENTION

The production of polyisocyanates with a uretdione structure by catalytic dimerization and optionally simultaneous trimerization of monomeric aliphatic or cycloaliphatic diisocyanates is known. A comprehensive summary of the industrially relevant state of the art dimerizing methods and the catalysts or catalyst systems used in the process can be found in J. prakt. Chem. 336 (1994) 185–200.

Among the light-resistant uretdione polyisocyanates the linear dimerized forms of 1-isocyanate-3,3,5-trimethyl-5-isocyanate methylcyclohexane (isophoronediisocyanate; IPDI), without isocyanurate groups, have special properties. They may for example act as preferred starting components in the production of cross-linking agents for polyurethane (PUR) coating powders not containing any blocking agents (as described for example in EP-A 45 996, EP-A 639 598 or EP-A 669 353). However, uretdione polyisocyanates obtained from IPDI by most of the known processes have a very high or fairly high trimer content, dependent on the type of catalyst used. At the present time only two catalyst systems are known, which can be used to obtain virtually linear IPDI dimers such as are required as starting components for uretdione cross-linking agents for coating powders.

EP-A 45 995 describes the use of special peralkylated aminophosphines as catalysts for selective dimerization of IPDI. The dimerization catalyst preferably used, hexamethylphosphorous acid triamide (tris-(dimethylamino)-phosphine), enables pure IPDI uretdiones to be prepared with a trimer content<2 wt. %. The serious disadvantage of the method is the high sensitivity of aminophosphines to oxidation. This causes for example hexamethylphosphorous acid triamide to react spontaneously in the presence of atmospheric oxygen to form hexamethylphosphoric acid triamide (HMPT), a compound known to be highly carcinogenic. This side reaction, which cannot be totally excluded on an industrial scale, greatly restricts practical application for workplace health and safety reasons.

EP-A 317 744 describes a method of preparing linear (cyclo)aliphatic uretdiones by catalysis with 4-dialkylaminopyridines such as 4-dimethylaminopyridine (DMAP). This method also provides linear IPDI uretdiones almost free of isocyanurate groups, although these have a very strong inherent color. By using phosphine or phosphite stabilizers in the DMAP-catalyzed dimerization in accordance with EP-A 735 027 or EP-A 896 973 the color quality can indeed be improved, but the improvement is often still not sufficient for special applications, for example to prepare uretdione cross-linking agents for clear polyurethane coating powders.

The two catalyst systems, the aminophosphines of EP-A 45 995 and the dialkylaminopyridinees of EP-A 317 744, both have the additional disadvantage of having only moderate catalytic activity with IPDI. High catalyst concentrations of up to 2 wt. % have to be used to obtain a fast enough reaction.

It is an object of the invention to provide a new method of preparing uretdione polyisocyanates which produces mostly linear, light-colored products, preferably free of isocyanurate, using highly reactive and selective catalysts.

The object was achieved by preparing them by the method of the invention.

SUMMARY OF THE INVENTION

The invention relates to a method for preparing a polyisocyanate with at least one uretdione group by oligomerizing part of the isocyanate groups of isophorone diisocyanate in the presence of a catalyst which accelerates the dimerization of isocyanate groups, wherein the oligomerization catalyst contains a saline compound containing from 10 to 100 wt. % of 1,2,3- and/or 1,2,4-triazolate structures (calculated as $C_2N_3$; molecular weight=66) in the anion.

The subject of the invention is also the use of the uretdione polyisocyanates made by this method as starting components for polyurethane plastics, particularly as isocyanate components for producing uretdione cross-linking agents for coating powders.

DETAILED DESCRIPTION OF THE INVENTION

The isophoronediisocyanate used in the method of the invention may be prepared by a wide variety of processes, for example by phosgenation or by a phosgene-free method such as urethane splitting.

The oligomerization catalysts used in the method of the invention are saline compounds containing 10 to 97.1 wt. % of 1,2,3- and/or 1,2,4-triazolate structures (calculated as C2N3; molecular weight 66) in the anion. They are compounds containing triazolate structures of formula (I) and/or (II)

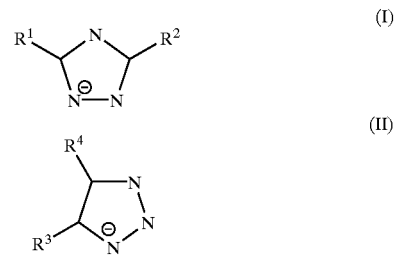

in the anion, where $R^1$, $R^2$, $R^3$ and $R^4$ independently represent hydrogen, fluorine, chlorine, bromine, a nitro group, a saturated or unsaturated aliphatic or cycloaliphatic radical, a substituted or unsubstituted aromatic or araliphatic radical which contains up to 20 carbon atoms and optionally up to 3 heteroatoms selected from oxygen, sulphur and nitrogen, wherein the substituents optionally are halogen atoms or nitro groups, and where $R^3$ and $R^4$ in formula (II), combined and together with the carbon atoms of the 1,2,3-triazolate five-membered compound and optionally a further nitrogen atom or an oxygen atom, can form anellated rings with 3 to 6 carbon atoms.

Preferred oligomerization catalysts are those which contain in the anion triazolate structures of general formula (I), where $R^1$ and independently represent hydrogen, fluorine, chlorine, bromine, a nitro group, a saturated or unsaturated aliphatic or cycloaliphatic radical, a substituted or unsubstituted aromatic or araliphatic radical which contains up to 12 carbon atoms and optionally up to 3 heteroatoms selected from oxygen, sulphur and nitrogen, wherein the substituents optionally are halogen atoms or nitro groups.

Similarly preferred oligomerization catalysts are those containing in the anion triazolate structures of general formula (II), where $R^3$ and $R^4$ independently represent hydrogen, fluorine, chlorine or bromine or a nitro group, a saturated or unsaturated aliphatic or cycloaliphatic radical, an optionally substituted aromatic or araliphatic radical which contains up to 12 carbon atoms and optionally up to 3 heteroatoms selected from oxygen, sulphur and nitrogen and which may optionally be substituted by halogen atoms or nitro groups and, combined and together with the carbon atoms of the 1,2,3-triazolate five-membered compound and optionally a further nitrogen atom or an oxygen atom, can form anellated rings with 3 to 6 carbon atoms.

Salts of 1,2,4-triazole, 1,2,3-triazole and/or 1,2,3-benzotriazole are particularly preferred oligomerization catalysts for the method of the invention.

The catalysts used according to the invention may contain a wide variety of cations as counterions to the catalytically active triazolate anions. Examples include alkali metal cations such as $Li^+$, $Na^+$ and $K^+$, alkaline earth cations such as $Mg^{2+}$ and $Ca^{2+}$ and ammonium or phosphonium cations of general formula (III)

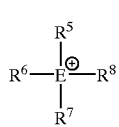

(III)

where

E represents nitrogen (N) or phosphorus (P), $R^5$, $R^6$, $R^7$ and $R^8$ independently represent a hydrogen atom, a saturated or unsaturated aliphatic or cycloaliphatic radical, a optionally substituted aromatic or araliphatic radical which contains up to 24 carbon atoms and optionally up to 3 heteroatoms from the oxygen, sulphur and nitrogen range and which may optionally be substituted by halogen atoms or hydroxy groups, and where $R^8$ may also stand for a radical of formula (IV)

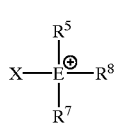

(IV)

in which

X represents a double-bonding, optionally substituted aliphatic, cycloaliphatic, araliphatic or aromatic radical with up to 12 carbon atoms.

Preferred cations are alkaline ions or monovalent ammonium or phosphonium cations of general formula (III), where E represents nitrogen or phosphorus and $R^5$, $R^6$, $R^7$ and $R^8$ independently represent a saturated aliphatic or cycloaliphatic radical or a optionally substituted aromatic or araliphatic radical with up to 18 carbon atoms.

Some of the saline compounds used as oligomerization catalysts in the method of the invention are commercially obtainable for example in the form of their sodium salts; others are easily accessible by normal laboratory methods as demonstrated by the examples.

In the method of the invention these catalysts are employed in quantities of 0.01 to 3 wt. %, preferably 0.1 to 1 wt. % based on the IPDI used. They may be added to the reaction mixture without solvents; however the catalysts are preferably used dissolved in a suitable organic solvent. The degree of dilution of the catalyst solutions may be chosen freely within a very wide range. Solutions from a concentration of 0.01 wt. % are catalytically effective.

Suitable catalyst solvents include those which are inert relative to isocyanate groups, such as hexane, toluene, xylene, benzol chloride, acetic acid ethyl ester, acetic acid butyl ester, diethylene glycol dimethylether, dipropyleneglycol dimethylether, ethyleneglycol monomethyl or ethyl etheracetate, diethyleneglycolethyl and butyletheracetate, propyleneglycol monomethyl etheracetate, 1-methoxypropyl-2-acetate, 3-methoxy-n-butylacetate, propyleneglycol diacetate, acetone, methylethylketone, methylisobutylketone, cyclohexanone, lactones such as β-propiolactone, γ-butyrolactone, ε-caprolactone and ε-methylcaprolactone, but also solvents such as N-methylpyrrolidone and N-methylcaprolactam, 1,2-propylene carbonate, methylene chloride, dimethyl sulphoxide, triethyl phosphate or any mixtures of such solvents.

However the catalyst solvents used in the method of the invention preferably carry groups reactive with isocyanates and are included in the reaction product. Some examples of such solvents are mono or multivalent simple alcohols such as methanol, ethanol, n-propanol, isopropanol, n-butanol, n-hexanol, 2-ethyl-1-hexanol, ethylene glycol, propylene glycol, the isomeric butane diols, 2-ethyl-1,3-hexanediol or glycerin; ether alcohols such as 1-methoxy-2-propanol, 3-ethyl-3-hydroxymethyl oxetane, tetrahydrofurfuryl alcohol, ethylene glycol monomethylether, ethylene glycol monoethylether, ethylene glycol monobutylether, diethylene glycol monomethylether, diethylene glycol monoethylether, ethylene glycol monobutylether, diethylene glycol, dipropylene glycol or liquid, higher molecular weight polyethylene glycols, polypropylene glycols, mixed polyethylene/polypropylene glycols and monoalkyl ethers thereof; ester alcohols such as ethylene glycol monoacetate, propylene glycol monolaurate, glycerinmono and diacetate, glycerinmonobutyrate or 2,2,4-trimethyl-1,3-pentanediolmonoisobutyrate; unsaturated alcohols such as allyl alcohol, 1,1-dimethyl allyl alcohol or oleic alcohol; araliphatic alcohols such as benzyl alcohol; N-monosubstituted amides such as N-methyl formamide N-methylacetamide, cyanacetamide or 2-pyrrolidinone or any mixtures of such solvents.

If appropriate the oligomerization reaction in the method of the invention is terminated by means of suitable catalyst poisons at the desired stage of the reaction, for example when 10 to 60% of the isocyanate groups originally in the starting mixture have reacted. Such catalyst poisons include inorganic acids such as hydrochloric, phosphorous or phosphoric acid, acid chlorides such as acetyl chloride, benzoyl chloride or isophthaloyl dichloride, sulphonic acids and sulphonic acid esters, such as methane sulphonic acid, p-toluene sulphonic acid, trifluoromethane sulphonic acid, perfluorobutane sulphonic acid, p-toluene sulphonic acid methylester and ethylester, mono and dialkylphosphates such as monotridecylphosphate, dibutylphosphate and dioctylphosphate, but also silylized acids such as methane sulphonic acid trimethylsilylester, trifluoromethane sulphonic acid trimethylsilylester, phosphoric acid tris-(trimethylsilylester) and phosphoric acid diethylester trimethylsilylester.

The quantity of catalyst poison required to stop the reaction depends on the quantity of catalyst employed; an equivalent quantity of stopper is generally used, relative to the oligomerization catalyst initially introduced. However if allowance is made for any catalyst losses occurring during the reaction even 20 to 80 equivalent % of catalyst poison, relative to the quantity of catalyst initially introduced, may be enough to stop the reaction.

Although not generally necessary, additives normally used in polyurethane chemistry may optionally be employed as stabilizers in the method of the invention. Some examples of the additives in question include phenolic antioxidants such as 2,6-di-tert.-butyl-4-methylphenol, 2,4,6-tri-tert.-butylphenol and 3,5-di-tert.-butyl-4-hydroxyanisol, or phosphite stabilizers trisubstituted with alkyl and/or aryl radicals, such as triphenyl phosphite, tris(nonyl-phenyl)phosphite, diphenylisooctylphosphite, diphenylisodecylphosphite, diisodecylphenylphosphite, diisooctyl-octylphenylphosphite, phenyineopentyl glycol phosphite, 2,4,6-tri-tert.-butylphenyl-(2-butyl-2-ethyl-1,3-propane diol)phosphite, triisodecyl phosphite, trilauryl phosphite, tris(tridecyl)phosphite, diisodecyl-pentaerythritol diphosphite, distearyl-pentaerythritol diphosphite, bis(2,4-di-tert.-butyl-phenyl)-pentaerythritol diphosphite and tetraphenyl-dipropylene glycol diphosphite or any mixtures of such additives.

These additives are, if appropriate, added to the reaction mixture in quantities of up to 5 wt. %, preferably up to 3%, relative to the quantity of IPDI employed.

In a special embodiment of the method of the invention additives of this type which are liquid at room temperature, preferably said liquid phosphite stabilizers, preferably act as solvents for the catalysts used.

The method of the invention is preferably carried out without solvents, apart from any catalyst solvents used. However it may, if desired, be carried out in the presence of further quantities of solvents which are inert relative to isocyanate groups. Some examples of suitable solvents include the non-reactive solvents already described above as possible catalyst solvents, or mixtures thereof which may, if appropriate, be used in quantities of up to 80 wt. % relative to the total quantity of IPDI and added solvent.

To carry out the method of the invention IPDI is put in first, optionally in inert gas such as nitrogen, optionally in the presence of a suitable solvent and optionally of a stabilizer of the said type at a temperature of 0 to 100° C., preferably 20 to 60° C. An oligomerization catalyst or a solution of an oligomerization catalyst of the above-mentioned type is added in the above-mentioned quantity, and the temperature is adjusted to 20 to 100° C. or preferably 25 to 80° C. optionally by taking a suitable step (heating or cooling). The reaction may optionally be terminated on reaching a defined degree of oligomerization of 10 to 60 wt. %, preferably 10 to 40%, by adding a catalyst poison of the type mentioned as examples and, if appropriate, by subsequently briefly heating the reaction mixture for example to a temperature above 80° C. The "degree of oligomerization" refers to the percentage of the isocyanate groups present in the original mixture that is consumed during the reaction according to the invention (particularly by dimerization, also with trimerization and, if the for example alcoholic catalyst solvents described are used, by reaction with isocyanate groups for example with urethanization). Said degree of oligomerization is generally reached after a reaction time of 30 minutes to 8 hours, preferably 1 to 6 hours.

The volatile components of the reaction mixture (excess monomeric IPDI and any non-reactive solvents and stabilizers used) are then removed, preferably by thin-layer distillation under a high vacuum and under the gentlest possible conditions, for example at a temperature of 120 to 200° C., preferably 140 to 180° C.

In a further embodiment of the method of the invention said volatile components are separated from the oligomerization product for example by extraction with appropriate solvents which are inert relative to isocyanate groups, for example aliphatic or cycloaliphatic hydrocarbons such as pentane, hexane, heptane, cyclopentane or cyclohexane.

In accordance with the invention light-colored or almost colorless, highly viscous IPDI polyisocyanates having uretdione groups are obtained, their content of isocyanate groups being 16.0 to 19.0 wt. %, preferably 16.7 to 17.9% dependent on the degree of oligomerization, the IPDI polyisocyanates containing less than 5 wt. %, preferably less than 2% and particularly preferably less than 1% of monomeric IPDI starting material. The molar proportion of isocyanurate structures in the products of the method according to the invention to the sum of uretdione and isocyanurate groups is preferably a maximum of 10 mol %, more preferably a maximum of 8 mol % and most preferably a maximum of 5 mol %.

The distilled materials obtained, which in addition to the non-reacted monomeric IPDI contain any solvents and stabilizers used and optionally active catalyst if catalyst poison is not employed, may be utilized for repeat oligomerization without any problems.

In the method of the invention, after partial catalytic oligomerization and termination of the reaction at the intended degree of oligomerization by adding a catalyst poison, separation of the surplus, non-reacted IPDI can optionally be dispensed with. In that case the products obtained from the process are light-colored solutions of IPDI polyisocyanate in up to 70 wt. % monomeric IPDI.

The method of the invention makes it possible to prepare IPDI uretdiones which differ from those obtainable by known methods in having hitherto unattained low color numbers, in a simple manner using very low concentrations of toxicologically harmless catalysts and within very short reaction times.

IPDI uretdiones prepared according to the invention or solutions thereof in monomeric IPDI are particularly valuable starting materials for the preparation of polyurethane plastics by the polyaddition process and preferably for producing single or two-component polyurethane paints, by virtue of their properties. In a form blocked by known blocking agents from polyurethane chemistry they may also be used for single-component stoving enamels. Some examples of suitable blocking agents include oximes known from polyurethane chemistry as blocking agents for isocyanate groups, such as acetone oxime, butanone oxime and cyclohexanone oxime, lactams such as $\epsilon$-caprolactam, C—H-azide compounds such as malonic acid diethylester and acetic ester, N-heterocycles such as 1,2,4-triazole, dimethyl-1,2,4-triazole, 3,5-dimethylpyrazol and imidazole and any mixtures of those blocking agents.

The IPDI-uretdiones obtainable by the method of the invention are particularly suitable starting components for the preparation of uretdione cross-linking agents for coating powders.

EXAMPLES

Unless otherwise stated all percentages given relate to weight.

Preparation of Catalysts

Catalyst 1: sodium 1,2,4-triazolate 200 ml of dry methanol and 48 ml of a 30% solution of sodium methanolate in methanol, corresponding to 0.25 mol sodium methanolate, were put first into a three-necked flask agitator with a mechanical stirrer, internal thermometer and reflux cooler, with dry nitrogen. 17.4 g (0.25 mol) of 1,2,4-triazole was added in portions at room temperature. When the addition of the 1,2,4-triazole had been completed the reaction mixture was agitated for 4 hours at reflux temperature. The solvent was then distilled off at reduced pressure and the oily residue left was mixed with 200 ml of methylene chloride at room temperature. The mixture was agitated for 15 minutes at room temperature and the product precipitated as a solid was filtered off. 22.5 g sodium-1,2,4-triazolate (yield 98%) was obtained in the form of a colorless powder. The product was $^1$H-NMR spectroscopically pure and free of any 1,2,4-triazole included.

Catalyst 2: sodium-1,2,3-triazolate 17.4 g (0.25 mol) of 1,2,3-triazole was reacted in 200 ml methanol with an equivalent quantity of sodium methanolate solution in methanol by the method described for catalyst 1. The reaction mixture was processed as described and 22.4 g sodium-1,2,3-triazolate was obtained (yield 98%) in the form of a virtually colorless powder. The product was pure according to the $^1$H-NMR spectrum and free of starting material (educt).

Catalyst 3: sodium benzotriazoleate 29.8 g (0.25 mol) of benzotriazole was reacted in 200 ml methanol with an equivalent quantity of sodium methanolate solution in methanol by the method described for catalyst 1. The reaction mixture was processed as described and 34.2 g sodium benzotriazoleate was obtained (yield 97%) in the form of a virtually colorless powder. The product was pure according to the $^1$H-NMR spectrum and free of starting material.

Catalyst 4: tetrabutylphosphonium-1,2,4-triazolate 18.0 g of a 30% solution of sodium methanolate in methanol, corresponding to 0.1 mol sodium methanolate, was put first into a three-necked flask agitator with a mechanical stirrer, internal thermometer and reflux cooler, at room temperature with dry nitrogen. A solution of 6.9 g (0.1 mol) of 1,2,4-triazole in 20 ml methanol was added drop by drop within 20 minutes, then the reaction mixture was agitated for an hour, after which 41.3 g (0.1 mol) of a 71.4% solution of tetrabutylphosphonium chloride in isopropanol (Cyphos 443P, produced by Cytec) was added within 20 minutes. As soon as the addition of the phosphonium salt was started precipitation of sodium chloride commenced. The reaction mixture was agitated for a further hour at room temperature, filtered and finally reduced in a rotary evaporator at a bath temperature of 40° C. and a pressure of approx. 1 mbar to a volume of approx. 50 ml. The residue was filtered again, giving 42.5 g of a clear, almost colorless solution of tetrabutylphosphonium-1,2,4-triazolate in a mixture of methanol and isopropanol. The content of active catalyst, obtained by acidimetric titration with 0.1 n HCl against phenolphthalein, was 73% and the ratio of methanol to isopropanol determined by gas chromatography (GC) was 25.4:74.6% (area %).

Catalyst 5: tetrabutyylphosphonium-1,2,3-triazolate

Using the method described for catalyst 4, 6.9 g (0.1 mol) of 1,2,3-triazole was reacted, via the intermediate stage of the sodium salt, with an equivalent quantity of the solution of tetrabutylphosphonium chloride in isopropanol described in Example 4. After reduction in a rotary evaporator and filtration 48.1 g of a clear, almost colorless solution of tetrabutylphosphonium-1,2,3-triazolate in a methanol/isopropanol mixture was obtained. The content of active catalyst, obtained by acidimetric titration with 0.1 n HCl, was 66.3% and the ratio of methanol to isopropanol determined by GC was 35.2:64.8% (area %).

Catalyst 6: tetrabutyylphosphonium-benzotriazoleate

Using the method described for catalyst 4, 11.9 g (0.1 mol) of benzotriazole was reacted, via the intermediate stage of the sodium salt, with an equivalent quantity of the solution of tetrabutylphosphonium chloride in isopropanol described in Example 4. After reduction in a rotary evaporator and filtration 52.1 g of a clear, slightly yellow solution of tetrabutylphosphonium-benzotriazolate in a methanol/isopropanol mixture was obtained. The content of active catalyst, obtained by acidimetric titration with 0.1 n HCl, was 69.7% and the ratio of methanol to isopropanol determined by GC was 31.6:64.8% (area %).

Catalyst 7: benzyltriethylammonium-1,2,4-triazolate

Using the method described for catalyst 4, 6.9 g (0.1 mol) of 1,2,4-triazole dissolved in 20 g methanol was reacted first with 18.0 g (0.1 mol) of a 30% methanol solution of sodium methanolate then with 90.8 g of a 25% solution of benzyltriethylammonium chloride in 2-ethylhexanol, corresponding to 0.1 mol benzyltriethylammonium chloride. After reduction in a rotary evaporator and filtration 94.1 g of a clear, slightly yellow solution of benzyltriethylammonium-1,2,4-triazolate in a methanol/2-ethylhexanol mixture was obtained. The content of active catalyst, obtained by acidimetric titration with 0.1 n HCl, was 26.5% and the ratio of methanol to 2-ethylhexanol determined by GC was 5,0:95.0% (area %).

Catalyst 8: methyltrioctylammonium-1,2,4-triazolate

Using the method described for catalyst 4, 6.9 g (0.1 mol) of 1,2,4-triazole dissolved in 20 g methanol was reacted first with 18.0 g (0.1 mol) of a 30% methanol solution of sodium methanolate then with 80.6 g of a 50% solution of methyltrioctylammonium chloride (Aliquat 336) in methanol, corresponding to 0.1 mol methyltrioctylammonium chloride. After filtration, removal of the solvent in a rotary evaporator and further filtration, 40.3 g of methyltrioctylammonium-1,2,4-triazolate was obtained as a clear, light yellow liquid. The content of active catalyst, obtained by acidimetric titration with 0.1 n HCl, was 92.3%.

Example 1

1000 g (4.50 mol) of isophorone diisocyanate (IPDI) were mixed with a solution of 2 g (0.022 mol) sodium-1,2,4-triazolate (catalyst 1) in 25 ml dimethylsulphoxide (DMSO) at 40° C. under dry nitrogen and with agitation, whereupon the temperature of the reaction mixture rose to 43° C. owing to the reaction heat produced. After a reaction time of 45 minutes, during which the exothermic effect died down, the NCO content of the reaction mixture had dropped to a value of 29.4%, corresponding to a 20.1% degree of oligomerization. The catalyst was deactivated by adding 4.6 g (0.022 mol) of dibutylphosphate. The turbidity created was filtered off and the clear, colorless reaction mixture was freed from its volatile constituents (excess diisocyanate and catalyst solvent) by means of a thin-film evaporator at a temperature of 160° C. and a pressure of 0.3 mbar. A colorless uretdione polyisocyanate was obtained, with a content of free NCO groups of 17.6%, a monomeric IPDI content of 0.3%, a viscosity (to DIN 53 018) of over 200 000 mPas (23° C.) and a color number (APHA), determined on a 10% solution in methylene chloride, of 8. The molar ratio of uretdione to isocyanurate groups, obtained by $^{13}$C-NMR spectroscopy, was 96.2:3.8.

Example 2

1000 g (4.50 mol) of isophorone diisocyanate (IPDI) were mixed with a solution of 1.2 g (0.013 mol) of sodium-1,2,3-triazolate (catalyst 2) in 15 ml dimethylsulphoxide (DMSO) at 40° C. under dry nitrogen and with agitation; the reaction mixture was slightly heated to approx. 42° C. After a reaction time of 2 hours the NCO content of the reaction mixture had dropped to a value of 29.4%, corresponding to a 20.1% degree of oligomerization. The catalyst was deactivated by adding 4.6 g (0.022 mol) of dibutylphosphate. The turbidity created was filtered off and the clear, colorless reaction mixture was freed from volatile constituents (excess diisocyanate and catalyst solvent) as described in Example 1. A highly viscous, colorless uretdione polyisocyanate was obtained, with a 16.9% content of free NCO groups, a 0.3% content of monomeric IPDI and a color number (APHA), determined on a 10% solution in methylene chloride, of 8. $^{13}$C-NMR spectroscopy shows the product to be free of isocyanurate groups.

Example 3

1000 g (4.50 mol) of isophorone diisocyanate (IPDI) were mixed with a solution of 1.3 g (0.009 mol) sodium-benzotriazolate (catalyst 3) in 13 ml dimethylsulphoxide (DMSO) at 40° C. under dry nitrogen and with agitation; the reaction mixture was heated slightly by 2 to 3° C. The exothermic effect dies down after about 30 minutes and, after a reaction time of 2 hours the NCO content of the mixture had dropped to a value of 29.3%, corresponding to a 21.3% degree of oligomerization. The catalyst was deactivated by adding 1.9 g (0.009 mol) of dibutylphosphate. The turbidity created was filtered off and the clear, colorless reaction mixture was freed from its volatile constituents (excess diisocyanate and catalyst solvent) as described in Example 1. A highly viscous, light yellow uretdione polyisocyanate was obtained, with a 16.9% content of free NCO groups, a 0.5% content of monomeric IPDI and a color number (APHA), determined on a 10% solution in methylene chloride, of 9. The molar ratio of uretdione to isocyanurate structures, obtained by $^{13}$C-NMR spectroscopy, was 94.1:5.9.

Example 4

1000 g (4.50 mol) of isophorone diisocyanate (IPDI) were degassed under vacuum (2 mbar) for 1 hour, then ventilated with dry nitrogen and heated to 40° C. 2.3 g (5.1 mmol) of catalyst 4 (tetrabutylphosphonium-1,2,4-triazolate in methanol/isopropanol) was stirred in, and the reaction mixture was heated to 43° C. by the reaction heat produced. 35 minutes later, when the exothermic effect had died down, further catalysis was carried out with an additional 2.3 g (5.1 mmol) of catalyst solution. After a total reaction time of 1 hour 10 minutes the NCO content of the reaction mixture was 32.3%, corresponding to a 14.2% degree of oligomerization. The catalyst was deactivated by adding 2.15 g (10.2 mmol) of dibutylphosphate and the resultant clear, slightly yellow mixture was freed from excess diisocyanate by thin-layer distillation as described in Example 1. A highly viscous, light yellow uretdione polyisocyanate was obtained, with a 17.3% content of free NCO groups, a 0.5% content of monomeric IPDI and a color number (APHA), determined on a 10% solution in methylene chloride, of 9. The molar ratio of uretdione to isocyanurate structures, obtained by $^{13}$C-NMR spectroscopy, was 96.1:3.9.

Example 5

1000 g (4.50 mol) of isophorone diisocyanate (IPDI) were degassed under vacuum as described in Example 4, ventilated with dry nitrogen and heated to 40° C. 2.3 g (4.7 mmol) of catalyst 5 (tetrabutylphosphonium-1,2,3-triazolate in methanol/isopropanol) was stirred in, and the reaction mixture was heated slightly to 42° C. by the reaction heat produced. 2 hours later, when the exothermic effect had died down, further catalysis was carried out with an additional 2.3 g (4.7 mmol) of catalyst solution and again 55 minutes later with 1.15 g (2.3 mmol) of catalyst solution. After a total reaction time of 5 hours 15 minutes the NCO content of the reaction mixture was 29.8%, corresponding to a 20.7% degree of oligomerization. The catalyst was deactivated by adding 2.45 g (11.7 mmol) of dibutylphosphate and the resultant clear, slightly yellow mixture was freed from excess diisocyanate by thin-layer distillation as described in Example 1. A highly viscous, light yellow uretdione polyisocyanate was obtained, with a 17.3% content of free NCO groups, a 0.5% content of monomeric IPDI and a color number (APHA), determined on a 10% solution in methylene chloride, of 8. The molar ratio of uretdione to isocyanurate structures, obtained by $^{13}$C-NMR spectroscopy, was 94.9:5.1.

Example 6

1000 g (4.50 mol) of isophorone diisocyanate (IPDI) were degassed under vacuum as described in Example 4, ventilated with dry nitrogen and heated to 40° C. 2.7 g (5.0 mmol) of catalyst 6 (tetrabutylphosphonium-benzotriazolate in methanol/isopropanol) was stirred in, and the reaction mixture was slightly heated to about 42° C. by the reaction heat produced. After a reaction time of 40 minutes, during which the exothermic effect dies down, the NCO content of the reaction mixture was 31.5%, corresponding to a 16.4% degree of oligomerization. The catalyst was deactivated by adding 1.05 g (5.0 mmol) of dibutylphosphate and the resultant clear, light yellow mixture was freed from excess diisocyanate by thin-layer distillation as described in Example 1. A highly viscous, yellow uretdione polyisocyanate was obtained, with a 17.0% content of free NCO groups, a 0.3% content of monomeric IPDI and a color number (APHA), determined on a 10% solution in methylene chloride, of 11. The molar ratio of uretdione to isocyanurate structures, obtained by $^{13}$C-NMR spectroscopy, was 92.8:7.2.

Example 7

1000 g (4.50 mol) of isophorone diisocyanate (IPDI) were degassed under vacuum as described in Example 4, ventilated with dry nitrogen and heated to 40° C. 2.5 g (2.5 mmol) of catalyst 7 (benzyltriethylammonium-1,2,4-triazolate in methanol/2-ethylhexanol) was stirred in, and the reaction mixture was heated to about 44° C. by the reaction heat produced. When the exothermic effect had died down further catalysis was carried out three times at 45-minute intervals with an additional 2.5 g (2.5 mmol) of catalyst solution. After a total reaction time of 3 hours 10 minutes the NCO content of the reaction mixture was 29.6%, corresponding to a 20.9% degree of oligomerization. The catalyst was deactivated by adding 2.10 g (10.0 mmol) of dibutylphosphate and the resultant clear, yellow mixture was freed from excess diisocyanate by thin-layer distillation as described in Example 1. A highly viscous, light yellow uretdione polyisocyanate was obtained, with a 17.0% content of free NCO groups, a 0.4% content of monomeric IPDI and a color number (APHA), determined on a 10% solution in methylene chloride, of 10. The molar ratio of uretdione to isocyanurate structures, obtained by $^{13}$C-NMR spectroscopy, was 96.3:3.7.

Example 8

1000 g (4.50 mol) of isophorone diisocyanate (IPDI) were degassed under vacuum as described in Example 4, ventilated with dry nitrogen and heated to 40° C. 0.8 g (1.8 mmol) of catalyst 8 (methyltrioctylammonium-1,2,4-triazolate) was stirred in, and the reaction mixture was heated to about 42° C. by the reaction heat produced. After a reaction time of 45 minutes, during which the exothermic effect dies down, the NCO content of the reaction mixture was 29.7%, corresponding to a 21.4% degree of oligomerization. The catalyst was deactivated by adding 0.38 g (1.8 mmol) of dibutylphosphate and the resultant clear, colorless mixture was freed from excess diisocyanate by thin-layer distillation as described in Example 1. A highly viscous, almost colorless uretdione polyisocyanate was obtained, with a 16.9% content of free NCO groups, a 0.4% content of monomeric IPDI and a color number (APHA), determined on a 10% solution in methylene chloride, of 8. The molar ratio of uretdione to isocyanurate structures, obtained by $^{13}$C-NMR spectroscopy, was 98.8:1.2.

Comparative Example 1 (According to EP-A 317 744)

1000 g (4.50 mol) of isophorone diisocyanate (IPDI) were mixed with 20 g (2%) of 4-dimethylaminopyridine (DMAP) as catalyst at room temperature, under dry nitrogen and with agitation. After 20 hours the light yellow reaction mixture, which had a 28.7% NCO content corresponding to a 22.6% degree of oligomerization, was freed from volatile constituents by means of a thin-film evaporator at a temperature of 160° C. and a pressure of 0.3 mbar, without previous addition of a catalyst poison. A highly viscous, light yellow uretdione polyisocyanate was obtained, with a 17.8% content of free NCO groups, a 0.3% content of monomeric IPDI and a color number (APHA), determined on a 10% solution in methylene chloride, of 65. The $^{13}$C-NMR spectrum shows the product to be free of isocyanurate structures.

Comparative Example 2 (According to EP-A 896 973)

1000 g (4.50 mol) of isophorone diisocyanate (IPDI) were successively mixed with 10 g (1%) of triisodecylphosphite as stabilizer and 10 g (1%) of 4-dimethylaminopyridine (DMAP) as catalyst at room temperature, under dry nitrogen and with agitation. After 20 hours the light yellow reaction mixture, which had a 30.4% NCO content corresponding to an 18.0% degree of oligomerization, was freed from volatile constituents by means of a thin-film evaporator at a temperature of 160° C. and a pressure of 0.3 mbar, without previous addition of a catalyst poison. A highly viscous, yellow uretdione polyisocyanate was obtained, with a 17.5% content of free NCO groups, a 0.4% content of monomeric IPDI and a color number (APHA), determined on a 10% solution in methylene chloride, of 23.

Comparative Example 3 (According to EP-A 735 027)

1000 g (4.50 mol) of isophorone diisocyanate (IPDI) were mixed with 20 g (1%) of triphenylphosphite as stabilizer and 20 g (1%) of 4-dimethylaminopyridine (DMAP) as catalyst at room temperature, under dry nitrogen and with agitation. After 20 hours the light yellow reaction mixture, which had a 28.8% NCO content corresponding to a 20.8% degree of oligomerization, was freed from volatile constituents by means of a thin-film evaporator at a temperature of 160° C. and a pressure of 0.3 mbar, without previous addition of a catalyst poison. A highly viscous, yellowish-brown uretdione polyisocyanate was obtained, with a 17.2% content of free NCO groups, a 0.4% content of monomeric IPDI and a HAZEN color number, determined on a 10% solution in methylene chloride, of 47.

The comparative examples show that the dimerization process according to the invention requires considerably smaller quantities of catalyst than known state of the art processes yet gives a product with a far lower color number.

Example 8

Preparation of a Uretdione Coating Powder Hardener (use According to EP-A 639 598)

350.0 g (1.47 gram equivalent) of the IPDI uretdione polyisocyanate from Example 1, which had a 19.2% content of uretdione groups after hot titration, was put in first under dry nitrogen and heated to 80° C. A mixture of 176.0 g (0.88 gram equivalent) of a commercial ε-caprolactone polyesterdiol started on 1.4 butanediol, with an OH number of 280 mg KOH/g (Capa 203, produced by Solvay), 19.8 g (0.44 gram equivalent) of 1,4-butanediol and 19.5 g (0.15 gram equivalent) of 2-ethyl-1-hexanol was added within 30 minutes and agitated at a maximum reaction temperature of 100° C. until the NCO content of the mixture had dropped to a value of 0.8% after about 4 hours. The melt was poured onto a metal sheet to cool it and a polyaddition compound, containing uretdione groups and appropriate for cross-linking coating powders, was obtained in the form of a solid, colorless resin. The product had the following properties:

| | |
|---|---|
| NCO content: | 0.8% |
| content of uretdione groups (calculated): | 11.9% |
| melting point: | 81–84° C. |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method of preparing a polyisocyanate with at least one uretdione group by oligomerizing part of the isocyanate groups of isophorone diisocyanate in the presence of a catalyst which accelerates the dimerization of isocyanate groups, wherein the oligomerization catalyst comprises a saline compound comprising from 10 to 100 wt. % of 1,2,3- and/or 1,2,4-triazolate structures (calculated as $C_2N_3$; molecular weight=66) in the anion.

2. The method according to claim 1 wherein the saline compound comprises a triazolate structures of formula (I) and/or (II)

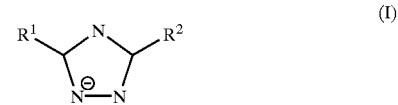

(II)

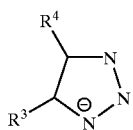

in the anion, where $R^1$, $R^2$, $R^3$ and $R^4$ independently represent hydrogen, fluorine, chlorine, bromine, a nitro group, a saturated or unsaturated aliphatic or cycloaliphatic radical, a substituted or unsubstituted aromatic or araliphatic radical which comprises up to 20 carbon atoms and optionally up to 3 heteroatoms selected from oxygen, sulphur and nitrogen, wherein the substituents optionally are halogen atoms or nitro groups, and where $R^3$ and $R^4$ in formula (II), combined and together with the carbon atoms of the 1,2,3-triazolate five-membered compound and optionally a further nitrogen atom or an oxygen atom, can form anellated rings with 3 to 6 carbon atoms.

3. The method according to claim 2 wherein $R^1$ and $R^2$ comprises up to 12 carbon atoms.

4. The method according to claim 2 wherein $R^3$ and $R^4$ comprise up to 12 carbon atoms.

5. The method according to claim 1 wherein the saline compound is prepared from 1,2,4-triazole, 1,2,3-triazole and/or 1,2,3-benzotriazole.

6. The method according to claim 1 wherein the oligomerization catalysts comprises a cation selected from the group of alkaline ions or monovalent ammonium or phosphonium cations of formula (III)

where

E represents nitrogen or phosphorus and $R^5$, $R^6$, $R^7$ and R8 independently represent a saturated aliphatic or cycloaliphatic radical or a unsubstituted or substituted aromatic or araliphatic radical with up to 18 carbon atoms.

7. The method of claim 1 further comprising breaking off the oligomerizing reaction at a defined degree of oligomerization by adding a catalyst poison.

8. The method of claim 1 further comprising removing the non-reacted excess diisocyanate by extraction or thin-layer distillation.

* * * * *